United States Patent
Ward et al.

(10) Patent No.: US 10,518,228 B2
(45) Date of Patent: Dec. 31, 2019

(54) DEVICE AND METHOD FOR GENERATING BUBBLES, USE OF THE DEVICE AND A FUEL CELL COMPRISING THE DEVICE

(71) Applicant: University of Chester, Chester (GB)

(72) Inventors: David Ward, Runcorn (GB); Robert Longman, Runcorn (GB)

(73) Assignee: University of Chester, Chester (GB)

( * ) Notice: Subject to any disclaimer, the term of this patent is extended or adjusted under 35 U.S.C. 154(b) by 243 days.

(21) Appl. No.: 15/547,039

(22) PCT Filed: Nov. 11, 2015

(86) PCT No.: PCT/GB2015/053424
§ 371 (c)(1),
(2) Date: Jul. 27, 2017

(87) PCT Pub. No.: WO2016/075462
PCT Pub. Date: May 19, 2016

(65) Prior Publication Data
US 2018/0008940 A1      Jan. 11, 2018

(30) Foreign Application Priority Data

Nov. 13, 2014 (GB) .................................. 1420200.6

(51) Int. Cl.
*B29C 59/16* (2006.01)
*B01F 3/04* (2006.01)
(Continued)

(52) U.S. Cl.
CPC ............ *B01F 3/04262* (2013.01); *B01F 3/04* (2013.01); *B01F 3/04808* (2013.01); *B29C 59/16* (2013.01); *H01M 8/04186* (2013.01); *H01M 8/188* (2013.01); *B01F 2003/04312* (2013.01); *B01F 2003/04361* (2013.01);
(Continued)

(58) Field of Classification Search
CPC ................................... B01F 3/04; B29C 59/16
See application file for complete search history.

(56) References Cited

U.S. PATENT DOCUMENTS

2013/0056076 A1* 3/2013 Longman ............ B01F 3/04262
137/1

FOREIGN PATENT DOCUMENTS

| GB | 1478223 A    | 6/1977 |
|----|--------------|--------|
| WO | 2006/046202 A1 | 5/2006 |
| WO | 2011/107794 A2 | 9/2011 |

OTHER PUBLICATIONS

Search and Examination Report dated May 21, 2015 in corresponding GB application No. GB1420200.6.

* cited by examiner

*Primary Examiner* — Robert A Hopkins
(74) *Attorney, Agent, or Firm* — Knobbe, Martens, Olson & Bear, LLP

(57) ABSTRACT

A device for generating bubbles, comprising a porous material having at least one hydrophilic surface (1), arranged such that a liquid (7) in which the bubbles (6) are intended to be formed may contact the hydrophilic surface (1) and at least one hydrophobic surface (2), arranged such that a gas (5) used to generate the bubbles (6) may flow past the hydrophobic surface (2) before it flows past the hydrophilic surface (1). The device may be used for creating fine bubbles in numerous applications, such as wastewater treatment, plant cultivation, aquafarming, aeration systems, bioreactors, fermeters, oil extraction or fuel cells.

17 Claims, 6 Drawing Sheets

(51) Int. Cl.
*H01M 8/18* (2006.01)
*H01M 8/04186* (2016.01)

(52) U.S. Cl.
CPC ............. *B01F 2215/0052* (2013.01); *B01F 2215/0073* (2013.01); *B01F 2215/0098* (2013.01); *B01F 2215/0404* (2013.01); *B01F 2215/0422* (2013.01); *B01F 2215/0431* (2013.01); *Y02E 60/528* (2013.01)

DEVICE AND METHOD FOR GENERATING BUBBLES, USE OF THE DEVICE AND A FUEL CELL COMPRISING THE DEVICE

CROSS-REFERENCE TO RELATED APPLICATIONS

This application is the U.S. National Phase under 35. U.S.C. § 371 of International Application PCT/GB2015/053424, filed Nov. 11, 2015, which claims priority to U.K. Patent Application No. 140200.6, filed Nov. 13, 2014.

FIELD OF THE INVENTION

The present invention relates to a device for generating bubbles and, more particularly, to a device for generating fine bubbles and various uses thereof. Also provided are a method of generating bubbles and a fuel cell including the device.

BACKGROUND OF THE INVENTION

Bubble formation is required in a variety of different fields and is a well studied and reported area of research. Recently, attention has been paid to various methods of utilising fine bubbles having a diameter of micrometer level and various apparatus for generating fine bubbles have been proposed. Fine bubbles are particularly advantageous as, for a given volume of gas, more smaller bubbles form a greater surface area than fewer larger bubbles.

Some of the common techniques used to form gas bubbles include: compressed air to dissolve air into a liquid stream, which is then released through nozzles to form bubbles by cavitation; air streams delivered under a liquid surface, where bubbles are broken off mechanically, optionally by agitation or shear forces; and ultrasonic induced cavitation.

In a system to generate air bubbles by introducing air into water flow with a shearing force using vanes and an air bubble jet stream, it is often required to employ a higher number of revolutions to generate cavitation. However, problems arise such as power consumption increase, corrosion of vanes or vibrations caused by the generation of cavitation. Further, such a technique does not lend itself to generating large amounts of fine bubbles.

The desire for small bubbles is that they provide a variety of excellent effects, which have been utilized in many industrial fields including plant cultivation, aquafarming, wastewater treatment and the like. It is effective to reduce the diameter of bubbles to increase their surface area relative to their volumes, thereby enlarging the contact area between the bubbles and the surrounding liquid. Thus, a more rapid mass transfer process can take place when the bubble size is reduced.

In wastewater treatment plants, it is known to aerate effluent, or sludge, as part of the wastewater purification process. Generally, air is introduced near the bottom of an aeration tank containing wastewater and bacterial floc via a system of pipes and/or hoses. As the air rises to the surface as air bubbles, some of the oxygen in the air is transferred to the wastewater and is consumed by the respiring bacteria during digestion, which aids in the treatment of sewage. The more oxygen that is supplied to the bacteria, the more efficient the digestion process. It is desirable, therefore, to provide smaller bubbles whereby to enhance further the efficiency of the digestion process.

A similar requirement exists in bioreactors and fermenters in cases where they are sparged for aeration purposes. Specifically, the yeast manufacturing industry has the requirement where growing and reproducing yeast bacteria need constant oxygen replenishment for respiration purposes.

However, in an aeration system using a conventional-type fine bubble generating system (such as a diffusion system based on injection), when air bubbles are injected under pressure through pores, the volume of each bubble is expanded and the diameter of each bubble is increased to several millimetres due to the surface tension of the air bubbles during injection, even when fine pores are provided. This method therefore encounters difficulty in generating fine bubbles of small diameter. Another problem associated with such a method is the clogging of the pores, which reduces the efficiency of the system.

A further application of small bubbles is the extraction of hard-to-lift oil reserves in some fields which either have little oil left, or have the oil locked in sand. Bubbling gas up through such oil-bearing reserves has the effect of lifting the oil as the bubbles rise under gravity and bring the oil with them. The bubbles are formed in water and pumped into the well or reserve and the oil is carried at the interface between the gas and water of each bubble as it passes through the reserves. Hence, the smaller the bubble, the greater the relative surface area for transporting the oil.

Bubbles are also used in fuel cells that utilise a liquid catalyst/mediator system. In some of these systems, oxidation of a redox couple after it has been reduced at the cathode is required. In order to do this, an oxidant such as oxygen or air is passed through the redox couple solution in the form of bubbles.

Given sufficient availability of oxygen in solution, this oxidation reaction is suggested to be rapid (Atherton et al., 2010). However, in practice, the overall reaction rate is limited by the transfer of oxygen into solution. The rate of oxygen mass transfer is directly proportional to the interfacial area between the gas and liquid phases. Small bubbles have a large collective interfacial area, thereby improving oxygen mass transfer to the liquid.

Fuel cells have numerous applications, many of which (such as in the automotive industry) require the fuel cell to have a small volume and a short residence time, as well as low power consumption. The preferred gas/liquid contacting method involves air sparging into a fast moving liquid stream, within a regenerator region. The volume of the fuel cell is partially dependent on the necessary size of the regenerator region, in which the redox couple is oxidised. This in turn is dependent upon the creation of a large interfacial area within a small volume, to maximise the oxygen mass transfer. Key to achieving this is the generation of small bubbles.

In certain applications, bubbles form on the surface of the device past which the liquid flows. The flow of liquid provides a shearing force on the bubbles, thereby prematurely shearing them from the porous surface before they are allowed to inflate to a larger size.

It is thus desirable to generate fine bubbles in a more convenient and efficient manner than known hitherto. Also important are durability and energy efficiency. To be of use in a number of applications, the device must incur a sufficiently low parasitic load and maintain performance over many hours (for example, around 10,000 hours with numerous start-stop cycles would be required for an automotive fuel cell).

The general perception is that in order to reduce the size of a bubble, the solitary requirement is for the pore size through which the bubble is formed to be reduced. However, there are a number of reasons why this perception is ill-conceived.

The first of these reasons is that the bubble is "anchored" to the substrate material through which it is formed, and will continue to inflate until the bubble breaks free by some disruptive force. The forces can, for instance, be buoyancy, inertial or shear forces applied to the bubble as it develops. The interfacial tension controls the force with which the bubble is held by virtue of it being anchored to the surface. In this way, there are three interactions that need be considered:
the interaction between the liquid and solid substrate;
the interaction between the liquid and gas; and
the interaction between the solid substrate and gas.

It has therefore been found that having an active surface on which bubbles are formed that attracts the liquid phase, for example a hydrophilic surface in the case of an aqueous liquid, is advantageous in producing small bubbles as the liquid favourably flows under the forming bubble and lifts it from the surface, thereby enhancing fine bubble generation.

Porous stainless steel sinter materials are known in industry as possible materials on which bubbles may form. Manufactured by the sintering of a fine steel powder of varied size and shape particles, the material has an inherent degree of randomness and non-uniformity. This is reflected in the size and shape of surface pores, as well as the size, tortuosity and interconnectivity of internal channels. The result is the existence of some "dead ended" channels and others which join significant distances laterally though the porous medium. This provides potential for uneven gas distribution across the porous surface. These characteristics are not terribly surprising considering that the material is developed primarily for the air filtration market (Grade 2 Mott is specified as excluding 99.9% of particles >2 mm in diameter).

However, the high degree of tortuosity can be beneficial as it restricts gas flow to the pores, generating a choked flow. This limits the rate of bubble growth and thus allows opportunity for them to be sheared from the surface at a smaller size than would be otherwise achieved. Bubble growth increases exponentially after reaching the diameter of the pore (i.e. after forming a hemisphere—see WO2011/107795 A2). If unchecked, this explosive growth can exceed the micro scale within a matter of nanoseconds. Hence, an effort to choke the ingress of gas into the bubble is desirable.

The fine surface pores (30-70 µm) of the sintered material do promote the generation of small bubbles. However, due to the range of pore sizes, their irregular shapes and random surface interconnectivity, it is the larger pores which tend to preferentially form bubbles. The formation of smaller bubbles from smaller pores requires more energy and so air flow will tend to divert and utilise the larger surface pores.

Although reasonable rates of oxidation are achievable when using this device in a fuel cell, inconsistent performance and a lack of durability are significant issues. Gas distribution across the porous surface often becomes uneven, resulting in the localised production of large bubbles, leading to significant variation in gas-liquid ratio throughout the contactor and a decline in available interfacial area. This culminates in poor oxidation performance and was observed to worsen with time.

The formation of fine bubbles is promoted by the high surface energy of the steel substrate and as such, the low contact angle between the liquid and the solid surface. However, it has been found that, combined with its fine interconnected pore structure, this property unfortunately means the material will very effectively wick liquid into its bulk with an estimated capillary pressure of about 300 mmH$_2$O. This can occur when gas flow is halted, either intentionally stopped as part of normal operation or while in operation via unutilised pores. Due to the additional pressure drop incurred by the gas when attempting to expel liquid, further pores may also become unutilised (i.e. blocked) as flow diverts to less impeded pathways. The consequence of this is a change in gas distribution and therefore, bubble size distribution. Gas distribution across the porous surface can become so uneven that a stable gas-liquid dispersion is no longer achievable. The issue is further exacerbated by the dehydration of back soaked solution within the porous bulk. It is hypothesised that these conditions (i.e. dried redox couple salts held at −80° C. in the case of a fuel cell) are favourable to the formation of insoluble deposits which accelerate the rate at which the pores become blocked.

Accordingly, a more durable device with more uniform fine bubble formation is required. The present invention has been devised with this in mind.

SUMMARY OF THE INVENTION

According to a first aspect of the present invention, there is provided a device for generating bubbles, comprising a porous material having at least one hydrophilic surface, arranged such that a liquid in which the bubbles are intended to be formed may contact the hydrophilic surface and at least one hydrophobic surface, arranged such that a gas used to generate the bubbles may flow past the hydrophobic surface before it flows past the hydrophilic surface.

Bubbles are "anchored" to the surface through which they are formed, and will continue to inflate until they break free by some disruptive force. The interfacial tension controls the force with which the bubble is held by virtue of it being anchored to the surface. The hydrophilic surface of the porous material promotes the formation and detachment of small bubbles as the liquid favourably flows under the forming bubble and lifts the bubble from the surface, thereby enhancing fine bubble generation.

However, due to the hydrophilic surface and the nature of the pores in the porous material, the liquid in contact with the hydrophilic surface may enter into the pores by capillary action. Once inside the pores, it may dry or crystallise, thereby blocking the pores with dried and/or insoluble components of the liquid. This can lead to irregular bubble formation. The presence of the hydrophobic surface behind the hydrophilic surface, relative to the liquid in which the bubbles are meant to be formed (which corresponds to the hydrophobic surface being in front of the hydrophilic surface relative to the gas supply) means that the ingress of the liquid will not extend too far into the material towards the gas supply, past the hydrophilic surface, as it will be stopped by the hydrophobic surface.

This can prevent back soaking of the liquid in which the bubbles are intended to be formed into the pores of the device by imposing a negative capillary pressure (i.e. repelling liquid from its pores). This therefore can prevent blocking of the pores of the device as the liquid is prevented from entering the pores, in which it could otherwise dry or crystallise.

The hydrophilic surface may extend along a face of the porous material, with the pores of the material extending away from the hydrophilic surface. This arrangement increases the contact of the hydrophilic surface with the liquid in which the bubbles are intended to be formed.

The hydrophobic surface may at least partially extend inside the pores of the porous material. This ensures that the liquid will not extend far into the pores of the porous material, thereby reducing the risk of the liquid depositing dried and/or insoluble compounds in the pores and thereby blocking them.

The hydrophobic surface may be provided by a second hydrophobic material. This provides a cheap and easy way of creating a hydrophobic surface in addition to a hydrophilic surface in the porous material, as hydrophobic materials are well known in the art. In this embodiment, the porous material may be hydrophilic. Alternatively, the porous material may be hydrophobic and the hydrophilic surface may be created by a separate hydrophilic material.

The second hydrophobic material may comprise a hydrophobic coating on at least part of the wall of the pores of the porous material. This prevents the liquid in which the bubbles are formed from entering the pores of the device. Even if there are additional hydrophobic surfaces behind the hydrophilic surface, such as the laminated membrane discussed below, the liquid may still be drawn into the hydrophilic pores by capillary action and so the pores of the porous material could still become blocked with dried and/or insoluble components of the liquid. The application of a hydrophobic layer to the inside of the pores changes this capillary pressure to a negative one, thereby preventing the movement of liquid into the pores of the device.

The second hydrophobic material may be porous. This means that it is gas permeable and so it can cover the pores in the porous material while still allowing gas to flow through. This will ensure that the gas flow will pass through the hydrophobic material before passing the hydrophilic surface. Such porous hydrophobic materials are well known in the art and are readily available.

The second hydrophobic material may be laminated to at least a portion of the porous material. The portion may cover a number of pores of the porous material. The lamination may be over the entire portion of the face of the porous material that is covered by the second hydrophobic material, or around the edges of said portion. If the lamination is only around the edges of the portion, the second hydrophobic material may be held in place during use by the gas pressure. The lamination may be by any suitable means, such as glue or another adhesive.

The second hydrophobic material may be inserted at least partially into the pores of the porous material. This ensures that all of the gas will flow through the second hydrophobic material before it flows through the porous material and past the hydrophilic surface. In one embodiment, this involves a plug type structure comprising the second hydrophobic material inserted into the pores of the porous material. The plug type structure may fill the entire pore volume. This prevents the liquid in which the bubbles are to be formed from entering the pore, which improves durability as the liquid cannot dry or crystallise and thereby block the pore. Further, this promotes the production of even smaller bubbles by reducing the gas volume within the pore. It is this volume that is used as a compressed gas reservoir as the bubble expands and so reducing its volume will reduce the size of the bubbles formed. The second porous portion may be glued or otherwise adhered to the pore of the first porous portion, or may be held in place by friction.

The second hydrophobic material may comprise a membrane. Membranes with suitable gas permeability are well known in the art and are readily available. Such membranes may have small, tortuous, randomly orientated pores naturally formed within them and so pores do not have to be artificially created. The advantages of such pores are discussed above. The membrane may comprise PTFE, polypropylene or polyethylene. All of these materials have small, tortuous, randomly orientated pores and further are hydrophobic, the advantages of which are also discussed above.

The porous material may have a higher gas permeability than the second hydrophobic material. In this embodiment, the second hydrophobic material can act as a choke, thereby limiting the amount of gas that reaches the porous material. This thereby leads to smaller bubble formation. This is especially true in applications in which the liquid in which the bubbles are intended to be formed is flowing. The limited gas supply means that the bubbles can be sheared from the surface of the device before they grow to a large size.

The second hydrophobic material may have pores of a smaller diameter than those of the porous material. This helps to increase the choke effect of the second hydrophobic material by reducing its gas permeability. In this embodiment, the larger pores of the porous material may be in connection with a plurality of smaller pores of the second hydrophobic material, such that air from many smaller pores flows through a single larger pore.

The pores of the second hydrophobic material may be tortuous. Such tortuosity limits the flow of gas through the second hydrophobic material, thereby improving the choking effect. The pores may also be interconnected and may include some "dead-ended" channels and others that join significant distances laterally through the second hydrophobic material. Additionally or alternatively, the pores of the second hydrophobic material may be randomly orientated. This further improves the choking effect. Further, portions with randomly orientated or tortuous pores that have a low gas permeability are well known in the art and so are easy and cheap to manufacture. This may be because such pores are naturally present in the material itself, rather than having to be artificially created.

The porous material may have a uniform structure. By "uniform structure" it is meant that the first porous layer has a uniform distribution of pores, each of the pores having the same dimensions. This helps to create more uniform bubbles in the liquid.

Uniform pores of a larger diameter are easier and cheaper to manufacture than those with a smaller diameter. The larger diameter also does not necessarily greatly increase the size of the bubbles formed, due to the choking effect of the second hydrophobic material. The pores of the porous material may be 10 to 100 µm in diameter, preferably between 30 and 90 µm in diameter. The pores of the second hydrophobic portion may be 1 to 5 µm in diameter, preferably 2 µm in diameter. In one embodiment, the pores of the second hydrophobic material are an order of magnitude smaller than the pores of the porous material.

The porous material may comprise pores positioned sufficiently far away from each other that the bubbles formed from each pore do not interact on the surface of the device. This advantageously prevents bubbles from merging with one another before they are released into the liquid, which thereby improves the uniformity of the bubble creation. This also increases the surface area of the bubbles formed, as the larger bubbles that would be created by smaller bubbles merging would have a lower surface area to volume ratio than the smaller bubbles.

The hydrophilic surface may comprise a foil. Foils suitable for this application are well known in the art. As such, suitable foils are cheap and easy to prepare, as well as being readily available. The foil may comprise stainless steel, which is particularly cheap and readily available.

The hydrophilic surface may comprise a coating, such as silicon dioxide, on the porous material. Such coatings are well known in the art and are readily available and cheap. In this case, the porous material itself may be hydrophobic.

According to a second aspect of the present invention, there is provided a method of generating bubbles, comprising providing a gas supply to the device of any preceding claim, such that the gas supply flows past the hydrophobic surface before it flows past the hydrophilic surface and providing a liquid in contact with the hydrophilic surface of the device.

In this method, the hydrophilic surface in contact with the liquid helps to release the bubbles, so that smaller bubbles are formed. Meanwhile, the hydrophobic surface closer to the gas supply (relative to the hydrophilic surface) at least partially prevents the liquid from entering the pores of the porous material, towards the gas supply. This prevents insoluble and/or dried components of the liquid being deposited within the pores, which may then block them.

According to a third aspect of the present invention, there is provided a use of the device described above for generating bubbles in wastewater treatment, plant cultivation, aquafarming, aeration systems, bioreactors, fermeters, oil extraction or fuel cells. All of these applications require bubble formation, preferably small bubble formation as provided by the device of the present invention.

According to a fourth aspect of the present invention, there is provided fuel cell comprising the device described above. The device of the present invention provides a simple way in which to create bubbles of a gas, which can then be introduced into an electrolyte solution. For example, bubbles of an oxidant gas can be introduced into a reduced catholyte solution to aid oxidation of the catholyte, or bubbles of a fuel gas can be introduced into an oxidised anolyte solution to aid reduction of the anolyte. Smaller bubbles, as can be created by the device of the present invention, are advantageous as they increase the rate of oxidation or reduction.

BRIEF DESCRIPTION OF THE DRAWINGS

One or more embodiments of the present invention will now be described, by way of example only, with reference to the following figures, in which:

FIG. 4b illustrates an ESM image of a cross-sectional view of the hydrophobic membrane of FIG. 4a;

DETAILED DESCRIPTION OF THE PREFERRED EMBODIMENTS

Figure 1:
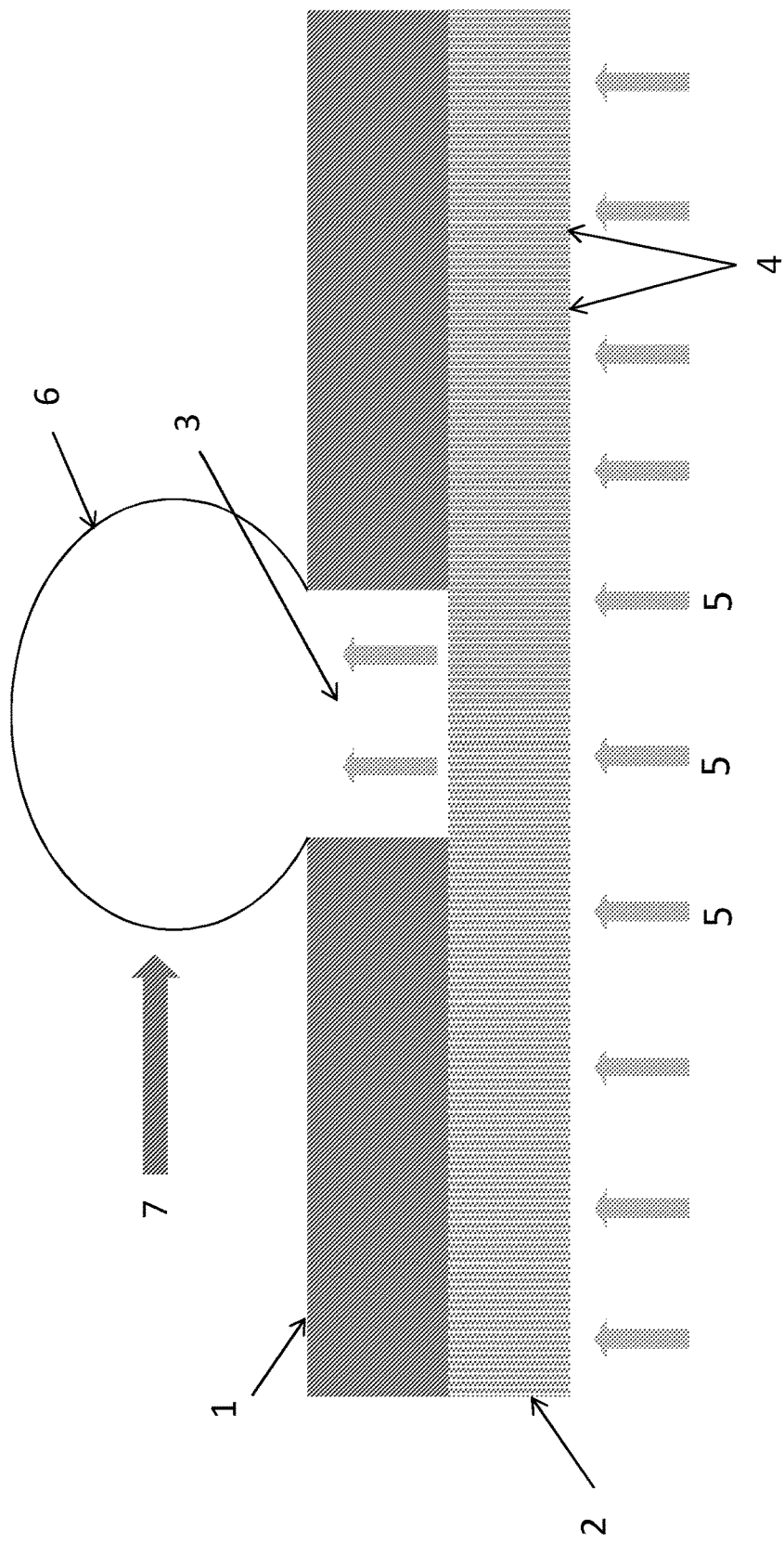
FIG. 1 illustrates a cross sectional view of a device of the present invention, showing a single pore of the porous material.

FIG. 1 illustrates a single pore 3 of the porous material 1. The second hydrophobic material 2 is laminated to the porous material 1. The porous material 1 comprises a stainless steel foil while the second hydrophobic material 2 comprises a PTFE membrane. The stainless steel material of the porous material 1 is hydrophilic and so forms the hydrophilic surface of the present invention.

The pore 3 of the porous material 1 is 90 μm diameter, while the pores 4 of the second hydrophobic material 2 are 2 μm diameter. The second hydrophobic material 2 is laminated around its edges to the porous material 1 and the pressure applied during use by the gas flow 5 holds the second hydrophobic material 2 against the porous material 1. The second hydrophobic material 2 covers multiple pores 3 of the porous material 1, though only one is shown.

Gas flow 5 reaches the second hydrophobic material 2 and flows through the pores 4 therein. As the pores 4 are narrow, this restricts the flow of gas through the second hydrophobic material 2. The pores 4 of the second hydrophobic material 2 are illustrated as being uniform and straight, though this is not necessarily the case and is more for diagrammatic purposes. In actuality, it is likely that the pores of a PTFE membrane will be randomly orientated and tortuous.

The gas flow 5 then reaches the pore 3 in the porous material 1. This results in the formation of a bubble 6 on the surface of the porous material 1, in the liquid 7. The liquid 7 flows past the porous material 1, which acts to shear the bubble 6 from the surface of the porous material 1, thereby helping to reduce the size of the bubble 6 being created. Further, the is hydrophilicity of the porous material 1 helps to release the bubbles 6 from the surface more easily.

The hydrophobicity of the second hydrophobic material 2 prevents the liquid 7 from entering the pores 4 of the second hydrophobic material 2. It also acts to partially prevent the liquid 7 from entering the pore 3 of the porous material 1. If the liquid 7 enters the pores 3, 4, it may dry and/or crystallise, resulting in a deposit of the dried or insoluble components of the liquid 7 in the pores 3, 4. This can block the pores 3, 4, resulting in non-uniform bubble formation.

As the porous material 1 is uniform in structure, pores 3, such as that illustrated in FIG. 1, are evenly distributed throughout the portion. This therefore results in the formation of uniform small bubbles 6 in the liquid 7.

Figure 2:
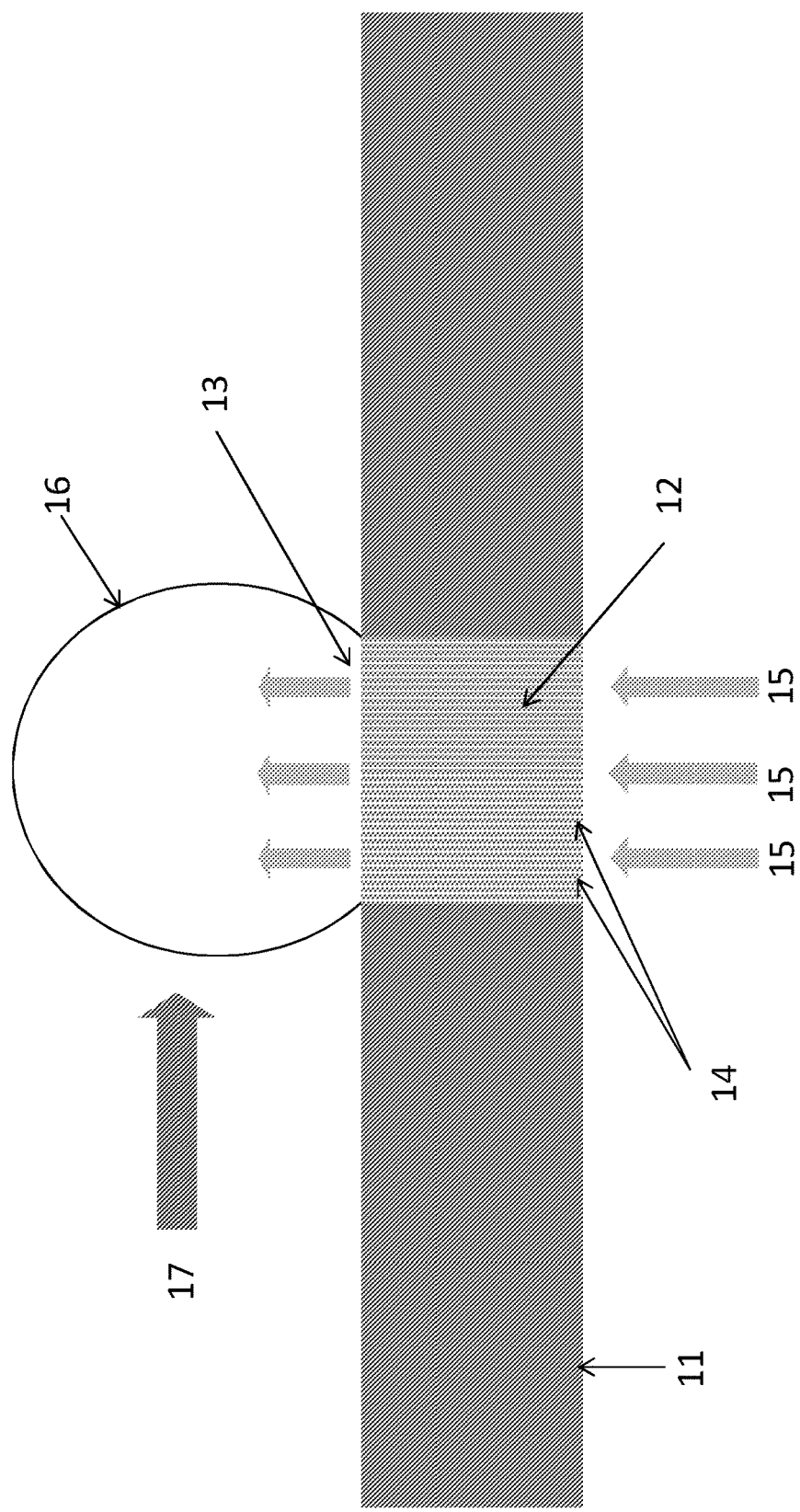
FIG. 2 illustrates a cross sectional view of a device of the present invention including a second hydrophobic material inserted into a pore of the porous material.

FIG. 2 illustrates a single pore 13 of the porous material 11, into which the second hydrophobic material 12 has been inserted. The porous material 11 comprises a stainless steel foil while the second hydrophobic material 12 comprises a PTFE membrane. The stainless steel material of the porous material 11 is hydrophilic and so forms the hydrophilic surface of the present invention.

The pore 13 of the porous material 11 is 90 μm diameter, while the pores 14 of the second hydrophobic material 12 are 2 μm diameter. The second hydrophobic material 12 is glued to the pore of the porous material 11.

Gas flow 15 reaches the pore 13 of the porous material 11 and must flow through the pores 14 of the second hydrophobic material 12 in order to pass through the pore 13. As the pores 14 are narrow, this restricts the flow of gas through the second hydrophobic material 12 and thereby also through the porous material 11. The pores 14 of the second hydrophobic material 12 are illustrated as being uniform and straight, though this is not necessarily the case and is more for diagrammatic purposes. In actuality, it is likely that the pores of a PTFE membrane will be randomly orientated and tortuous.

The second hydrophobic material 12 fills the entire volume of the pore 13 of the porous material 11. This makes it harder for the liquid 17 in which the bubbles 13 are to be formed to enter the pore 13, which improves durability as the liquid 17 cannot dry or crystallise and thereby block the pores 13 of the porous material 11. Further, this arrangement promotes the production of even smaller bubbles 16 by reducing the gas volume within the pore 13 of the porous material 11. It is this volume that is used as a compressed gas reservoir as the bubble 16 expands, and so reducing its volume will reduce the size of the bubbles 16 formed.

The gas flow 15 then forms a bubble 16 on the surface of the porous material 11, in the liquid 17. As in FIG. 1, the liquid 17 flows past the porous material 11, which acts to shear the bubble 16 from the surface of the porous material 11, resulting in smaller bubbles being created than would otherwise be formed. Further, the hydrophilicity of the porous material 11 acts to release the bubbles 16 from the surface more easily.

The hydrophobicity of the second hydrophobic material 12 prevents the liquid 17 from entering the pores 14 of the second hydrophobic material 12. In this embodiment, it therefore also prevents the liquid 17 from entering the pore 13 of the porous material 11. If the liquid 17 enters the pores 13, 14, it may dry and/or crystallise, resulting in a deposit of the dried or insoluble components of the liquid 17 in the pores 13, 14. This can block the pores 13, 14, resulting in non-uniform bubble formation.

As the porous material 11 is uniform in structure, pores 13, such as that illustrated in FIG. 2, are evenly distributed throughout the portion. This therefore results in the formation of uniform small bubbles 16 in the liquid 17.

Figure 3:
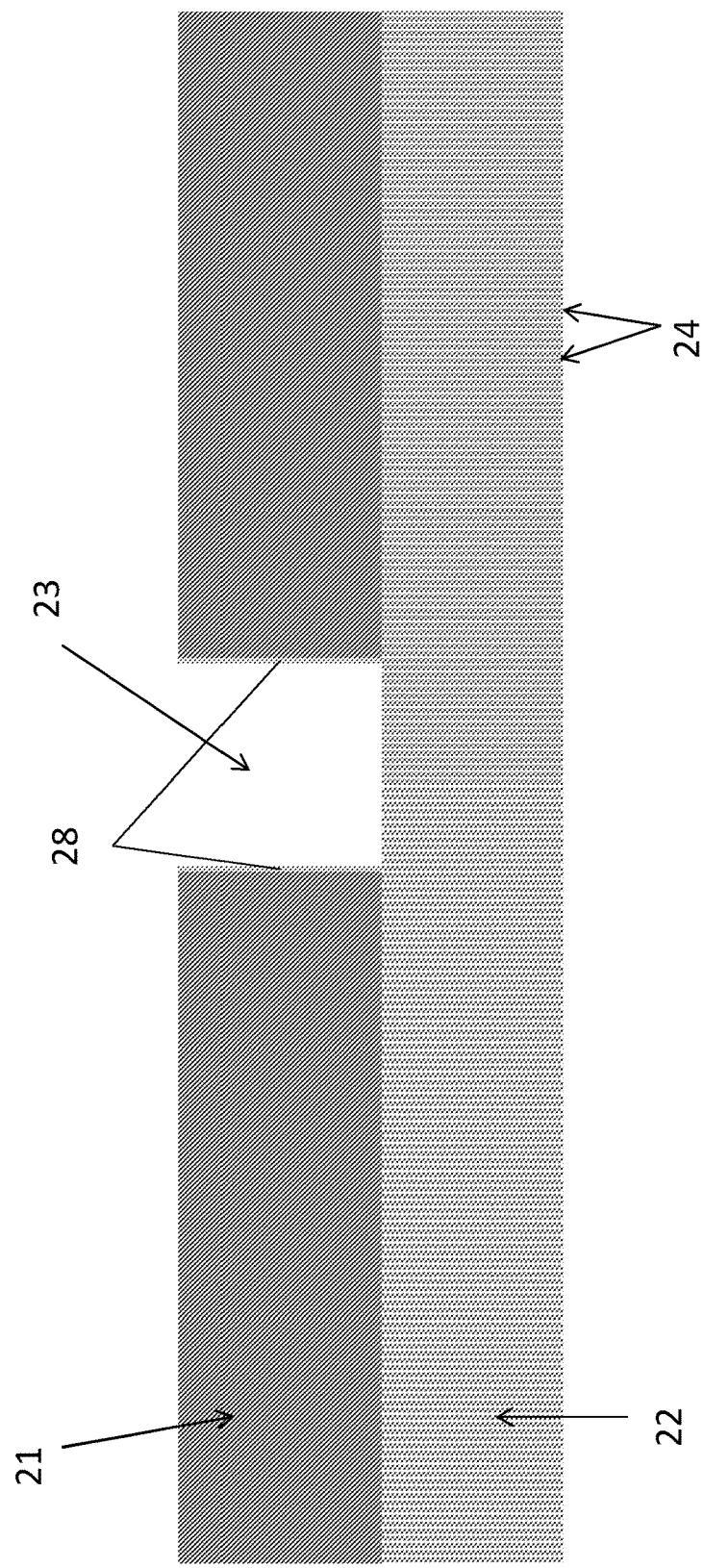
FIG. 3 illustrates a cross sectional view of a device of the present invention including a hydrophobic coating on the inside of a pore of the porous material.

FIG. 3 illustrates a single pore 23 of the porous material 21. The porous material 21 is laminated to the second hydrophobic material 22. The porous material 21 comprises a stainless steel foil while the second hydrophobic material 22 comprises a PTFE membrane. The stainless steel material of the porous material 21 is hydrophilic and so forms the hydrophilic surface of the present invention.

The pore 23 of the porous material 21 is 90 μm diameter, while the pores 24 of the second hydrophobic material 22 are 2 μm diameter. The second hydrophobic material 22 is laminated around its edges to the porous material 21 and the pressure applied during use by the gas flow holds the second hydrophobic material 22 against the porous material 21.

The functioning of the device of FIG. 3 is the same as that shown in FIG. 1. As with FIG. 1, the pores 24 of the second hydrophobic material 22 are illustrated as being uniform and straight, though this is not necessarily the case and is more for diagrammatic purposes. In actuality, it is likely that the pores of a PTFE membrane will be randomly orientated and tortuous.

The hydrophobicity of the second hydrophobic material 22 prevents the liquid from entering the pores 24 of the second hydrophobic material 22. It may also act to partially prevent the liquid from entering the pore 23 of the porous material 21. If the liquid enters the pores 23, 24, it may dry and/or crystallise, resulting in a deposit of the dried or insoluble components of the liquid in the pores 23, 24. This can block the pores 23, 24, resulting in non-uniform bubble formation.

Also shown in FIG. 3 is a hydrophobic coating 28 on the walls of the pore 23 of the porous material 21. This further acts to prevent the liquid in which the bubbles are formed from entering the pores 23 of the porous material 21. Despite the presence of the second hydrophobic material 22, the liquid may still be drawn into the pores 23 of the porous material 21 (which in this embodiment are hydrophilic) by capillary action and so the pores 23 of the porous material 21 could still become blocked with dried and/or insoluble components of the liquid. The application of a hydrophobic layer 28 to the inside of the pores 23 of the porous material 21 changes this capillary pressure to a negative one, thereby preventing the movement of liquid into the pores 23.

As the porous material 21 is uniform in structure, pores 23, such as that illustrated in FIG. 3, are evenly distributed throughout the portion. This therefore results in uniform small bubble formation in the liquid.

Example 1 is carried out in a fuel cell. The bubble formation devices tested were used to provide an oxidant to a catholyte that had been reduced at the cathode, in order to regenerate the catholyte. The device according to the present invention consisted of a semi permeable PTFE membrane (Zitex G-108, Saint-Gobain Performance Plastics Ltd, UK) (see Table 1 for general properties) and a 50 μm thick stainless steel foil, etched over a 150×40 mm area with around 42,000 90 μm holes.

The stainless steel foil is hydrophilic, while the PTFE membrane is hydrophobic. The PTFE membrane also has a lower gas permeability than the etched steel foil; due to the smaller pore size. Also tested under identical operating conditions was i) a microporous stainless steel foil with no membrane backing layer and ii) a sintered stainless steel bubble formation device (MOTT Grade 2, 150×40 mm panel).

Figure 4B:
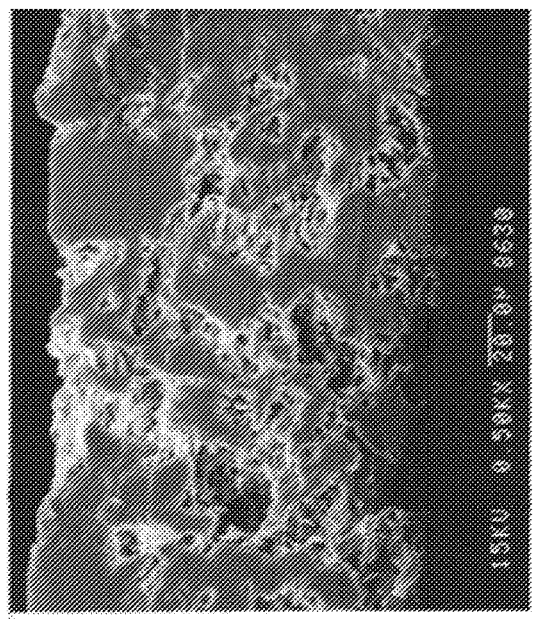
Figure 4A:
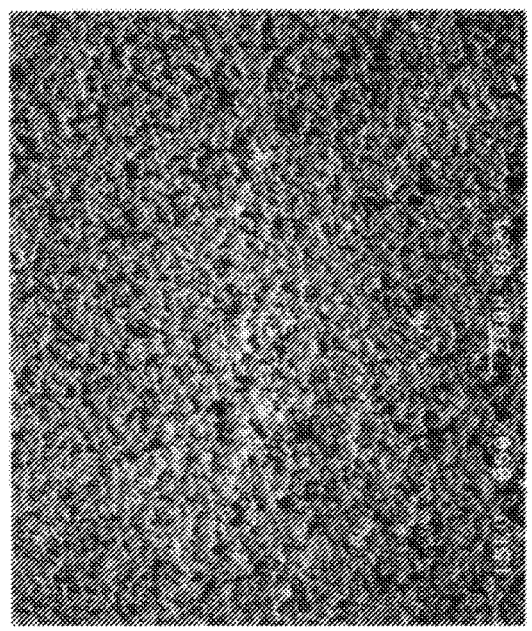
FIG. 4a illustrates an ESM image of a top view of a hydrophobic membrane for use in the present invention.

FIGS. 4a and 4b show ESM images of a top view and a cross-sectional view respectively of the PTFE membrane used. The top view of FIG. 4a is shown at 50× magnification and the cross-sectional view of FIG. 4b is shown at 100× magnification. As demonstrated by these figures, the PTFE membrane comprises numerous; small, tortuous passages throughout, some of which are dead-ended. This means that gas will flow through the membrane non-uniformly, with some areas of the membrane having greater gas permeability than others. Further, the membrane will have a lower gas permeability than the foil layer,

TABLE 1

Table of Zitex G-108 properties

| Property | Unit | Zitex G-108 |
| --- | --- | --- |
| Functional Pore Size | microns | 3-4 |
| Air Flow, 100 cc/1.0 in. 2/20 oz. (Gurley Densitometer Test) | seconds | 4-5 |
| Bubble Point (Ethanol) | psi | 1.0 ± 0.2 |
| Water Flow Rate Through 1 ft. 2 @ 13.5 psi | GPM | 40 ± 10 |
| Water Initiation Pressure | psi | 4 ± 0.5 |
| Breaking Strength | lbs./inch width (avg) | 9.6 |
| Elongation | % | 75 |
| Pore Volume | % | 45 |
| Thickness | inches | 0.008 ± 0.002 |

Figure 5:
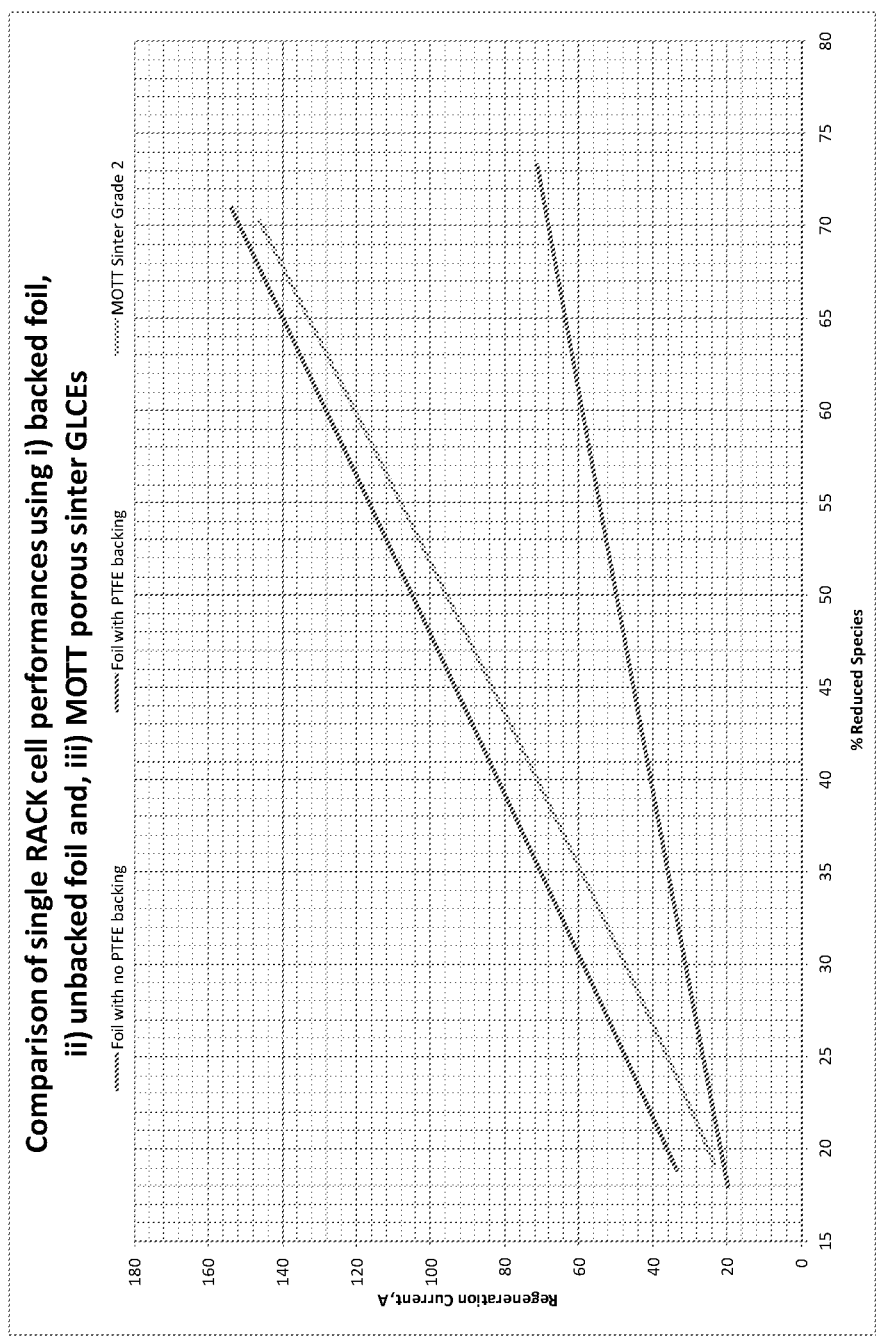
FIG. 5 illustrates a comparison of fuel cell performances under like conditions using i) backed foil according to the present invention, ii) unbacked foil and iii) MOTT porous sinter devices to oxidise a catholyte.
Figure 6:
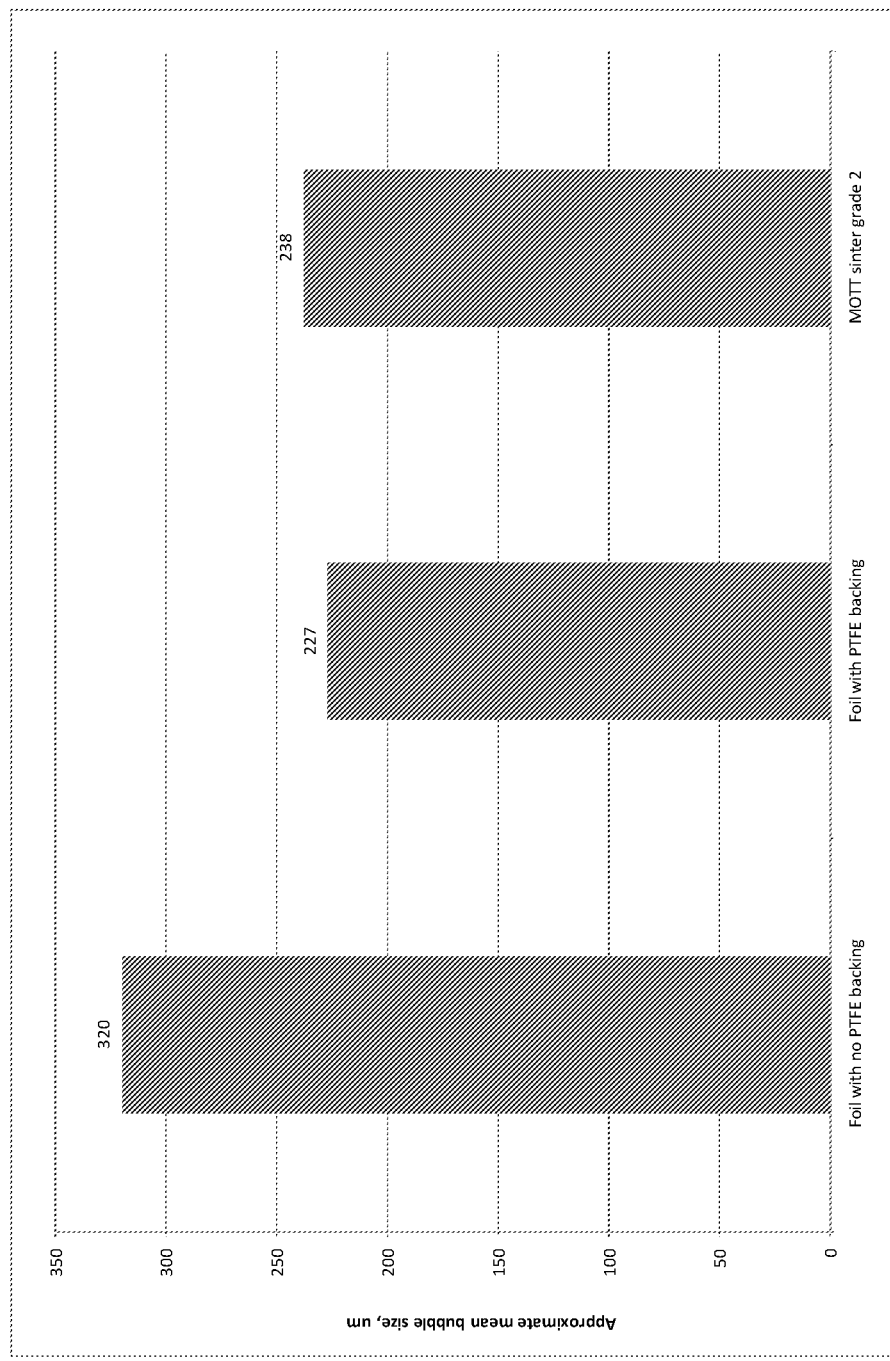
FIG. 6 illustrates a comparison of bubble size within a fuel cell under like conditions using i) backed foil according to the present invention, ii) unbacked foil and iii) MOTT porous sinter devices.

FIGS. 5 and 6 compare the results of these three tests in terms of regeneration current (i.e. a reflection of reaction rate) and bubble size. As shown in these figures, the addition of the membrane afforded significant benefits, such as faster reaction times and smaller bubble size. In addition, the membrane backed foil according to the present invention was suggested to outperform the sintered stainless steel of the prior art.

The backed foil of the present invention was also suggested to be more durable than the other arrangements. After several hours of operation, the visual performance of the unbacked foil was observed to deteriorate significantly (i.e. uneven gas distribution and the formation of large bubbles). Removal of the unbacked foil revealed many of the pores to have become blocked with dried and insoluble material. The sintered steel device was also observed to behave similarly. By contrast, the membrane backed foil showed a relatively small performance loss after approximately 50 hours cumulative operation.

The three arrangements were also operated at high gas: liquid ratios. Both the unbacked foil and sintered stainless steel devices were unable to generate stable foams beyond about 4:1. However, the backed foil was seen to support stable foams up to about 10:1.

What is claimed is:

1. A device for generating bubbles, comprising:
    a porous material having at least one hydrophilic surface, arranged to contact a liquid in which the bubbles are intended to be formed; and
    at least one hydrophobic surface, arranged to allow a gas used to generate the bubbles to flow past the hydrophobic surface before it flows past the hydrophilic surface
    wherein the hydrophobic surface is provided by a second material which is a hydrophobic material, the hydrophobic material being porous;
    wherein the hydrophobic material is arranged to cover the pores in the porous material or is inserted at least partially into the pores of the porous material such that a gas flow will pass through the hydrophobic material before passing the hydrophilic surface.

2. The device according to claim 1, wherein the hydrophilic surface extends along a face of the porous material, with the pores of the material extending away from the hydrophilic surface.

3. The device according to claim 1, wherein the hydrophobic surface at least partially extends inside the pores of the porous material.

4. The device according to claim 1, further comprising a hydrophobic coating on at least part of the wall of the pores of the porous material.

5. The device according to claim 1, wherein the hydrophobic material is laminated to at least a portion of the porous material.

6. The device according to claim 1, wherein the hydrophobic material comprises a membrane.

7. The device according to claim 6, wherein the membrane comprises PTFE, polypropylene or polyethylene.

8. The device according to claim 1, wherein the porous material has a higher gas permeability than the hydrophobic material.

9. The device according to claim 8, wherein the hydrophobic material has pores of a smaller diameter than those of the porous material.

10. The device according to claim 1, wherein the pores of the hydrophobic material are tortuous.

11. The device according to claim 1, wherein the pores of the hydrophobic material are randomly orientated.

12. The device according to claim 1, wherein the porous material has a uniform structure.

13. The device of claim 1, wherein the porous material comprises pores positioned with the spacing between pores is greater than the diameter of the generated bubbles such that the bubbles formed from each pore do not interact on the surface of the device.

14. The device according to claim 1, wherein the porous material comprises a foil, wherein the foil comprises stainless steel.

15. The device according to claim 1, wherein the hydrophilic surface comprises a coating, on the porous material, wherein the coating comprises silicon dioxide.

16. A method of generating bubbles, comprising:
    providing a gas supply to the device of any preceding claim, such that the gas supply flows past the hydrophobic surface before it flows past the hydrophilic surface; and
    providing a liquid in contact with the hydrophilic surface of the device.

17. A fuel cell comprising the device of claim 1.

* * * * *